United States Patent [19]

Prasad

[11] Patent Number: 5,449,457
[45] Date of Patent: Sep. 12, 1995

[54] LIQUID MEMBRANE MODULES WITH MINIMAL EFFECTIVE MEMBRANE THICKNESS AND METHODS OF MAKING THE SAME

[75] Inventor: Ravi Prasad, Charlotte, N.C.

[73] Assignee: Hoechst Celanese Corporation, Somerville, N.J.

[21] Appl. No.: 688,178

[22] Filed: Apr. 22, 1991

[51] Int. Cl.$^6$ ............................................. B01D 63/02
[52] U.S. Cl. .............................. 210/321.8; 210/500.23
[58] Field of Search ........................ 210/500.23, 500.28, 210/643, 644, 648, 321.79, 321.8, 324.88, 321.89

[56] References Cited

U.S. PATENT DOCUMENTS

| | | | |
|---|---|---|---|
| 3,342,729 | 9/1967 | Strand | 210/23 |
| 3,557,962 | 1/1971 | Kohl | 210/321 |
| 3,794,468 | 2/1974 | Leonard | 23/258 |
| 4,087,327 | 5/1978 | Feder et al. | 435/285 X |
| 4,460,641 | 7/1984 | Barer et al. | 428/246 |
| 4,750,918 | 6/1988 | Sirkar | 55/16 |
| 4,789,468 | 12/1988 | Sirkar | 210/137 |
| 4,940,617 | 7/1990 | Baurmeister | 428/36.3 |

FOREIGN PATENT DOCUMENTS

| | | |
|---|---|---|
| 0093677 | 9/1983 | European Pat. Off. . |
| 1189122 | 9/1983 | European Pat. Off. . |
| 0264696 | 10/1987 | European Pat. Off. . |
| 0345983 | 12/1989 | European Pat. Off. . |
| WO83/00098 | 1/1983 | WIPO . |

OTHER PUBLICATIONS

"A New Liquid Membrane Technique for Gas Separation", Aiche Journal, Jul. 1988, vol. 34, No. 7, Majumdar et al.

"Separation of Solutes from Aqueous Solutions by Contained Liquid Membranes", Aiche Journal, Oct. 1988, vol. 34, No. 10, Sengupta et al.

"Selective Separations Using Contained Liquid Membranes", Basu et al, Dept. of Chem. & Chem. Eng., Stevens Inst. of Technology, Hoboken, N.J.

"Hollow Fiber Contained Liquid Membrane Separation of Citric Acid", Basu et al, Dept. of Chem. & Chem. Eng. Center . . . , Hoboken, N.J.

"Mass Transfer With Contained Liquid Membranes", Nguyen et al, Hoechst Celanese Separations Products Division, Charlotte, N.C.

"Penicillin Separations With Contained Liquid Membranes", B. V. Sorenson, Hoechst Celanese Corporation, Charlotte, N.C.

"A Two-Dimensional Analysis of Membrane Thickness in a Hollow-Fiber-Contained Liquid Membrane Permeator", Majumdar et al, Journal of Membrane Science, 43 (1989) 259-276.

"Separation of Ethylene from EthanE . . . ", Teramoto et al, Journal of Membrane Science, 45 (1989) 115–136.

Abstract of a published Russian Patent Application SU1473160, publication date Sep. 23, 1990.

Aiche Journal, vol. 34, No. 7, Jul. 1988, pp. 1135–1145; S. Majumdar et al. "A New Liquid Membrane Technique for Gas Separation".

Aiche Journal, vol. 34, No. 10, Oct. 1988, pp. 1698–1708; A. Sengupta et al. "Separation of Solutes from Aqueous Solutions by Contained Liquid Membranes".

*Primary Examiner*—Frank Spear
*Attorney, Agent, or Firm*—R. H. Hammer, III

[57] ABSTRACT

Modules for use in fluid separations, especially contained liquid membrane separations, exhibit minimal effective membrane thickness. The modules have a module case and at least one pair of superposed fabric sheets disposed within the case, the fabric sheets being pleated and nested in the lengthwise direction of the case. Each fabric sheet contains warp-wise extending hollow fiber membranes. The hollow fiber membranes within the folds of one fabric sheet will therefore form alternating rows with the hollow fiber membranes within the folds of the other fabric sheet by virtue of the length-wise nested pleating. As a result, the effective membrane thickness value of the module is minimized thereby enhancing the efficacy of fluid separations.

11 Claims, 3 Drawing Sheets

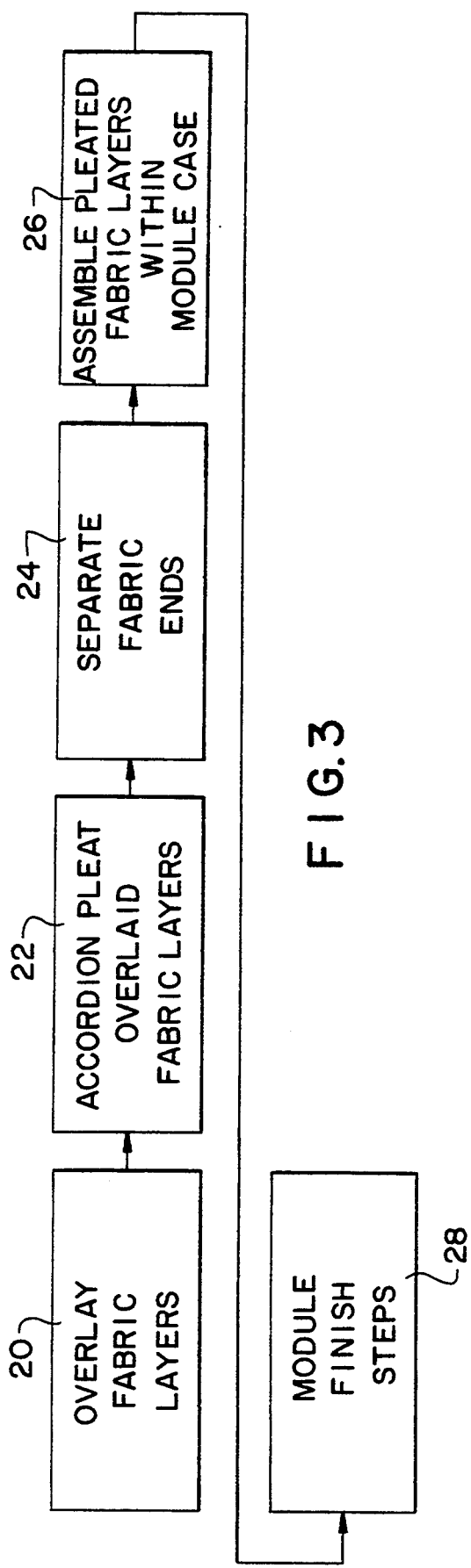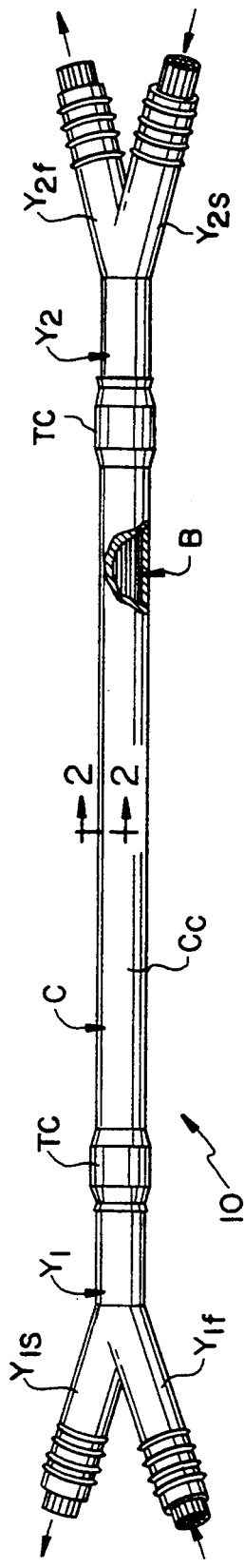

LIQUID MEMBRANE MODULES WITH MINIMAL EFFECTIVE MEMBRANE THICKNESS AND METHODS OF MAKING THE SAME

RELATED APPLICATIONS

This application is related to commonly owned U.S. application Ser. No. 07/688,179, now abandoned, and U.S. application Ser. No. 07/688,180, now U.S. Pat. No. 5,169,529, filed on even date herewith and entitled the same as this application, the entire contents of each application being expressly incorporated hereinto by reference.

BACKGROUND AND SUMMARY OF THE INVENTION

It has recently been suggested that microporous hollow fibers (MHF) may be employed in a liquid membrane separation technique whereby feed and sweep gases flow through the lumens of two different sets of hydrophobic MHF (designated feed-fibers and sweep-fibers, respectively), while a liquid on the shell side of the MHF serves as the membrane. See generally, Majumdar et al, "A New Liquid Membrane Technique for Gas Separation", AICHE Journal, vol. 34, No. 7, pages 1135–1145 (1988), and Sengupta et al, "Separation of solutes from Aqueous solutions by Contained Liquid Membranes", AIChE Journal, vol. 34, no. 10, pages 1698–1708 (1988), the entire content of each being expressly incorporated hereinto by reference. This so-called "contained liquid membrane" (CLM) technique is reported to have several advantages over conventional immobilized liquid membrane (ILM) separation technology.

For example, conventional ILM technology typically requires periodic replacement of the immobilized membrane liquid due to solute saturation, depletion and/or contamination (depending upon the type of separation being conducted). As a result, conventional ILM technology is typically only limited to batch separation processing. However, since the membrane liquid according to the recently proposed CLM technique is physically present in the shell-side of a separation module, it may be replenished and/or replaced more or less continually thereby allowing separation processing to be accomplished on an essentially continuous basis.

Modules for performing CLM separation processes typically include a bundle of hollow fiber membranes divided approximately equally into a set of feed-fibers (through which the feed fluid flows), and a set of strip-fibers (through which the strip fluid flows). The MHF bundle is physically housed within a module case of desired size and configuration such that the lumens of the feed- and strip-fibers are in fluid-communication with supply and discharge ports of the module case associated with the flow of feed and strip fluids, respectively. In this manner, a cocurrent or countercurrent gas flow through the respective sets of feed- and strip-fibers within the module case may be established.

Theoretically, when performing CLM separations, each of the feed-fibers should be in an immediately adjacent non-contacting relationship to a respective one of the strip-fibers so that the distance therebetween is filled with the membrane liquid. According to this ideal configuration, therefore, a theoretical minimum effective membrane thickness (EMT) is established whereby the closest packing of the feed and strip fibers is achieved so that the distance therebetween is minimized. However, conventional module manufacturing techniques fall far short of the theoretical minimum EMT since individual feed-fibers cannot exactly and reliably be interposed with individual strip-fibers. As a result, groupings of feed-fibers will reside in the module adjacent to groupings of strip-fibers thereby significantly increasing the module EMT over the theoretical minimum value.

It is towards providing solutions to the above problems that the present invention is directed. Broadly, therefore, the present invention is directed to modules containing hollow fiber membranes adapted to being used for contained liquid membrane separations which exhibit effective membrane thicknesses which are closer to the theoretical minimum value than can be obtained using conventional membrane manufacturing techniques.

More specifically, the present invention is directed to modules having superposed fabric sheets in which hollow fiber membranes are disposed in the fabric's warp-wise direction. The warp-wise hollow fiber membranes in one of the fabric sheets can therefore be dedicated as feed-fibers through which a feed fluid flows, whereas the hollow fiber membranes in the other of the fabric sheets can be dedicated as strip-fibers through which a strip fluid flows.

The superposed fabric sheets are also co-pleated with one another in the warp-wise direction so that the respective folds of the fabric sheets will be nested with one another. In this manner, the feed- and strip-fibers of the respective fabric sheets are alternately disposed within the module and are adjacent to strip- and feed-fibers, respectively. As a result, reduced EMT values as compared to conventional CLM modules may be obtained.

Preferably, the fabrics employed in the present invention are woven fabrics in which the warp-wise hollow fiber membranes are interwoven with weft-wise monofilamentary fibers. However, other fabric forms may also be utilized according to the present invention—for example, a knitted structure in which the hollow fiber membranes are inserted as a filling.

The weft-wise fibers serve to provide structural support for the warp-wise hollow fiber membranes so as to maintain fiber-to-fiber parallelism between the hollow fiber membranes in the lengthwise direction of the module. In addition, the weft-wise fibers serve as "spacers" which minimize (if not essentially eliminate) contact between the microporous hollow feed- and strip-fibers as well as imparting self-centering functions to the hollow fiber membranes in the superposed fabric layers. These functional characteristics of the weft-wise fibers further minimize the EMT value of the module (i.e., the module EMT approaches the theoretical value).

Further aspects and advantages of this invention will become more clear after careful consideration is given to the detailed description of the preferred exemplary embodiments thereof which follows.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is a side perspective view of a module according to the present invention which is partly sectioned to expose the superposed pleated fabric layers contained within the module case;

FIG. 3 is a block diagram illustrating the basic manufacturing steps employed in making the modules of the present invention.

DETAILED DESCRIPTION OF THE PREFERRED EXEMPLARY EMBODIMENTS

Accompanying FIG. 1 depicts a preferred embodiment of a contained liquid membrane module 10 according to the present invention. In this connection, the module 10 includes a case C and a microporous hollow fiber bundle B disposed within the interior space S (see FIG. 2) of the case.

Figure 2:
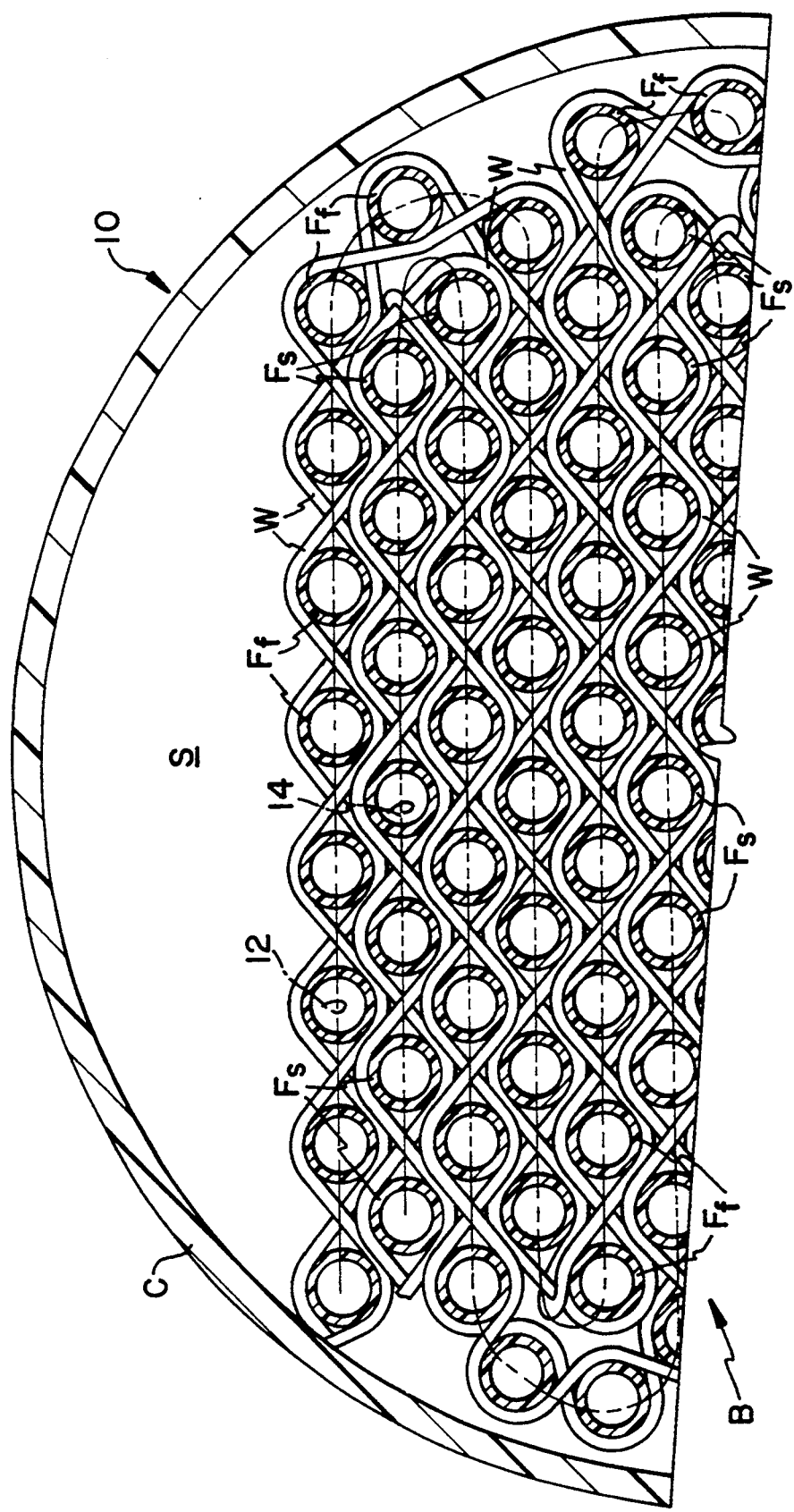
FIG. 2 is a partial cross-sectional view of the module shown in FIG. 1 as taken along line 2—2 therein, but in a greatly enlarged manner for clarity of presentation.

As is more clearly seen in the expanded scale of FIG. 2, the bundle B within the case C is comprised of superposed fabric sheets (designated in FIG. 2 by the single-dash chain line 12 and the double-dash chain line 14, respectively) which are co-pleated so as to be nested relationship with one another. The fabric sheets 12 and 14 include lengthwise coextensive microporous hollow feed-fibers and strip-fibers (a few of each are identified in FIG. 2 as $F_f$ and $F_s$, respectively). The lumens of the feed-fibers $F_f$ thus provide a path through which a feed fluid may flow, whereas the lumens of the strip-fibers $F_s$ provide a path through which the strip fluid may flow when the module 10 is placed into service during contained liquid membrane separations.

The module case C is most preferably comprised of a elongate central tube $C_c$ and a pair of Y-configured end tubes $Y_1$ and $Y_2$ are coupled to a respective end of the central tube $C_c$. The terminal ends of fabric sheet 12 will thus be separated from the terminal ends of fabric sheet 14 (preferably in a manner to be described below) and are disposed within a respective branch of each of the Y-configured tubes so as to allow the lumens of each of the microporous hollow feed- and strip-fibers $F_f$ and $F_s$, respectively, to be connected to a fluid source. That is, the terminal ends of the microporous hollow feed-fibers $F_f$ in fabric sheet 12 may be disposed within branch $Y_{1f}$ of Y-configured tube $Y_1$ while the opposite terminal ends of the feed-fibers $F_f$ in fabric sheet 12 may be disposed within branch $Y_{2f}$ of Y-configured tube $Y_2$. Similarly, the terminal ends of the strip-fibers $F_s$ in fabric sheet 14 may be disposed within branches $Y_{1s}$ and $Y_{2s}$, respectively, of Y-configured tubes $Y_1$ and $Y_2$. In this manner, therefore, the branches, $Y_{1f}$, $Y_{2f}$, $Y_{1s}$ and $Y_{2s}$ serve as supply and discharge ports for the fluid during separation processes in dependence upon the desired relative flow through the module 10. For example, countercurrent fluid flow is depicted in FIG. 1, but cocurrent fluid flow is similarly possible.

Each of the fabric sheets 12, 14 is most preferably a woven fabric in which the feed- and strip-fibers $F_f$ and $F_s$, respectively, are disposed in the warp-wise direction of the fabric. The weft-wise fibers W which are interwoven with the hollow fiber membranes constituting the feed-fibers $F_f$ and strip-fibers $F_s$, respectively, are preferably synthetic monofilamentary fibers, for example, monofilamentary fibers of nylon, polyester and the like. In this regard, it is especially preferred that the weft-wise fibers be formed essentially of the same synthetic resin as the feed- and strip-fibers $F_f$ and $F_s$.

The diameter of the monofilamentary weft-wise fibers W is preferably chosen so as to be significantly less than the diameter of the hollow fiber membranes which constitute the feed- and strip-fibers $F_f$ and $F_s$, respectively. In this regard, the strength characteristics of the weft fibers W provide a practical lower limit on their diameter given the synthetic resin from which they are formed. The weft fibers W should likewise not have too great a diameter as otherwise the separation performance of the module 10 may detrimentally be affected. As an exemplary guideline, the diameters of the weft fibers 10 are most preferably chosen so as to be greater than about 10 denier.

The weft-wise fibers W serve as spacers to essentially maintain a separation distance between the feed-fibers $F_f$ in fabric sheet 12 and the adjacent strip-fibers $F_s$ in fabric sheet 14. That is, adjacent ones of the feed- and strip-fibers $F_f$ and $F_s$, respectively, will be separated one from another at least by a dimension corresponding essentially to the denier of the weft-wise fibers W.

It will also be observed that the weft-wise fibers W serve self-centering functions. In other words, the weft-wise fibers W assist in orienting the adjacent individual feed-fibers $F_f$ and $F_s$ in the fabric sheets 12 and 14, respectively, in staggered relationship to one another (i.e., since the "peaks" of the weft-wise fibers bounding one of the warp-wise hollow fiber membranes of one fabric sheet will seat within respective weft-wise "valleys" between adjacent hollow fiber membranes within the adjacent nested fabric sheet.)

Virtually any hollow fiber having walls which exhibit permeability with respect to the selected chemical species desired to be separated may be employed in the modules 10 according to the present invention. Thus, as used herein and in the accompanying claims, the term "hollow fiber membrane" and like terms are intended to refer to hollow fibers whose walls are permeable to a selected chemical species. Thus, hollow fibers which are physically permeable (e.g., due to the presence of pores in the hollow fiber walls) and/or hollow fibers that are chemically permeable (e.g., due to the mass transport of a chemical species through the hollow fiber walls) are included within the meaning of this definition.

Preferably, however, the hollow fiber membranes employed in the modules of this invention are microporous hollow fibers made by the "up-spinning" techniques disclosed in U.S. Pat. Nos. 4,405,688 and 4,451,981, each in the name of James J. Lowery et al, and each being expressly incorporated hereinto by reference. Briefly, non-porous precursor hollow fibers are produced according to the techniques disclosed in these prior patents by melt spinning the precursor fibers in a substantially vertically upward direction (i.e., up-spinning). The thus melt spun hollow precursor fibers are then spin-oriented while subjecting them to a symmetrical quenching step using a hollow annular structure surrounding the precursor fiber which has one or more openings on its inner surface that distribute the quenching medium against the precursor fiber in a substantially uniform manner. The thus formed hollow precursor fiber may then be heat annealed by, for example, subjecting the non-porous precursor hollow fiber to a temperature of between about 5° C. to 100° C. for a time period of at least a few seconds (e.g., from a few seconds up to about 24 hours, preferably between about 30 minutes to about 2 hours).

The finished microporous hollow fibers will possess an average inner diameter in the range of from about 5 to about 1500 microns, and preferably in the range of from about 70 to about 1500 microns. The fibers are moreover characterized by a substantially uniform internal diameter (I.D.), for example, a coefficient of variation in inner diameter through a cross-section taken perpendicular to the axis of the fiber of less than about 8%, preferably less than about 5%, and more preferably less than about 3%.

The pores of the preferred microporous hollow fibers are essentially interconnected through tortuous paths which may extend from one exterior surface or surface region to another, i.e., open-celled. Further, the pores of the preferred microporous hollow fibers of the present invention are microscopic, i.e., the details of the pore configuration or arrangement are described only in terms of microscopic dimensions. Thus, the open cells or pores in the fibers are smaller than those which can be measured using an ordinary light microscope, because the wavelength of visible light, which is about 5,000 Angstroms, is longer than the longest planar or surface dimension of the open cell or pore. The pore size of the microporous hollow fibers may be defined by using electron microscopy techniques which are capable of resolving details of pore structure below 5,000 Angstroms or by mercury porosimitry techniques.

The average effective pore size of the microporous hollow fibers useable in the practice of this invention is preferably between 50 to 2000 Angstroms, and more typically between 100 to 1000 Angstroms. By "average effective pore size" is meant the smallest dimension of a pore which would allow a generally spherical particle of that same dimension to pass therethrough. The pores generally have an elongated shape with a width of from 50 to 2000 Angstroms, and a length of from 500 to 10,000 Angstroms. Hence, the "average effective pore size" of the preferred microporous hollow fibers will usually be determined by the width dimension of the pores. These pores will, moreover, be fairly uniform around the circumference of the fiber. For example, the preferred microporous hollow fibers will exhibit an average ratio of the maximum pore density to the minimum pore density around the circumference of the fiber of less than about 3:1, and usually less than about 2:1.

Microporous hollow fibers of the type described above are commercially available from Hoechst Celanese Corporation, Separations Products Division, Charlotte, N.C. under the registered trademark CELGARD ®.

Figure 4A:
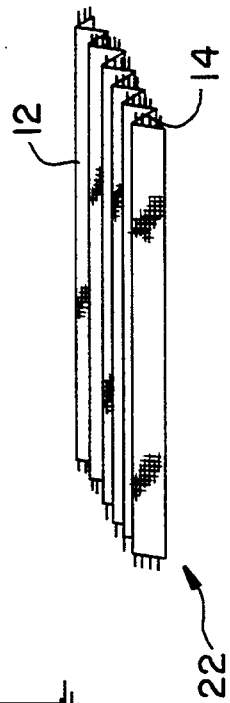
FIGS. 4a–4c are diagrammatic perspective views showing the manner in which fabric layers containing microporous hollow feed- and strip-fibers are superposed on one another, pleated and assembled within the module case.

Accompanying FIG. 3 shows in block fashion the principal fabrication steps employed to make the module 10 described above. In this connection, the fabric sheets 12, 14 are superposed with one another in step 20 as is schematically shown in accompanying FIG. 4a. During this step, care is taken to ensure that end portions of the fabric sheets are separated from one another (i.e., so as to segregate the set of hollow microporous feed-fibers from the set of microporous hollow strip-fibers in the superposed fabric layers). Preferably, segregation of the fabric sheet end portions is accomplished by interposing separator strips S between superposed end regions of the fabric sheets 12, 14 as shown in FIG. 4a.

Figure 4B:
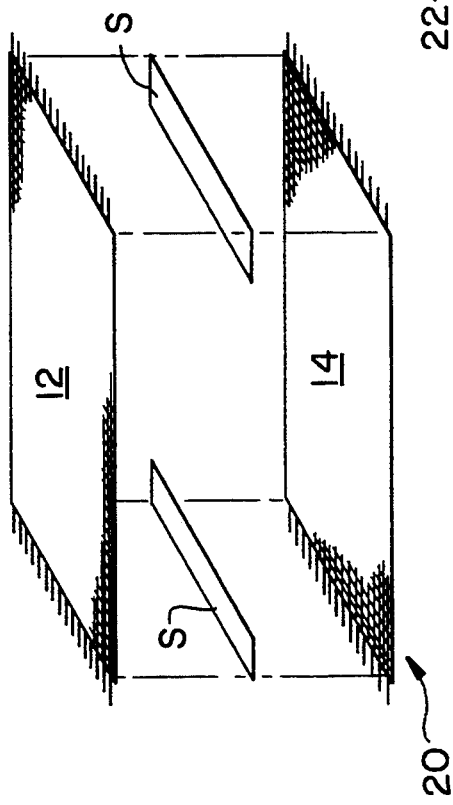

The thus superposed fabric sheets 12, 14 having the separator strips S interposed between adjacent end regions thereof, are then co-pleated in step 22 along the lengthwise dimension of the fabric sheets 22 (i.e., in an accordion fashion). The resulting accordion-pleated structure is schematically shown in FIG. 4b whereby the fabric sheets 12 and 14 are nested with one another.

Figure 4C:
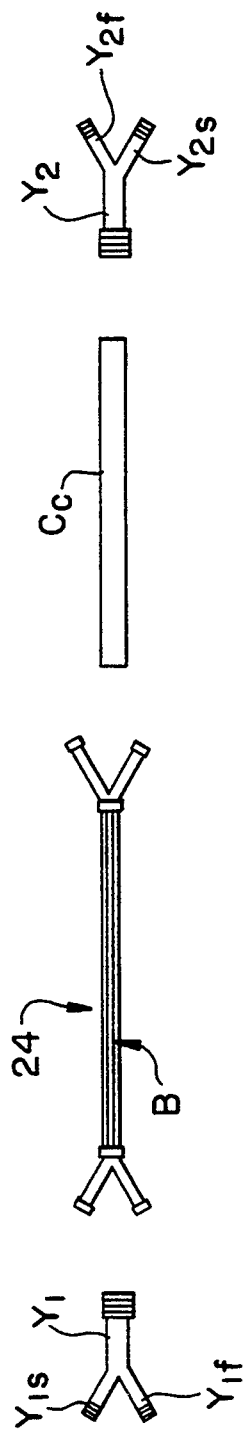

Once the accordion pleated structure has been obtained, the respective end regions of the fabric sheets 12 and 14 are segregated from one another in step 24 by gathering each end region and banding it with a suitable wrapping material (e.g., tape and/or the separator strips S). During step 24, the accordion-pleated fabric sheets are also gathered and banded with one another so as to facilitate their insertion with the module case C. The bundled and accordion pleated fabric sheets 12, 14 are then first introduced into the central tube $C_c$ during step 26, with the separated terminal end regions of fabric sheets 12, 14 then being inserted into their respective branch of the Y-configured ends $Y_1$ and $Y_2$ as schematically shown in accompanying FIG. 4c. The Y-configured tubes $Y_1$ and $Y_{2Y}$ are then assembled to the central tube by means of the tube couplings TC.

The module 10 is then finished in step 28, for example, by potting the terminal ends of the hollow fiber membranes within their respective branch of the Y-configured connectors $Y_1$ and $Y_2$, and conducting any needed quality control inspections. The finished module 10 is then packaged and shipped to the customer.

It will be appreciated that the particular geometry of the module 10 described above is only illustrative in that it represents a particularly preferred embodiment of this invention. Those in this art will recognize that the reduce EMT that ensues by virtue of the fabrication techniques of the present invention may have applicability in other end-use applications in which hollow fiber membranes are employed.

Therefore, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a module having a module case and sets of hollow feed-fiber and strip-fiber membranes within an interior space of said module case, the improvement wherein said sets of hollow feed-fiber and strip-fiber membranes constitute respective alternately superposed fabric sheets which are co-pleated and nested with one another along the length-wise direction of the module case, said hollow feed-fiber and strip-fiber membranes being disposed in the warp-wise direction of their respective fabric sheet and being interposed with weft-wise fibers, and wherein said weft-wise fibers maintain said feed-fiber and strip-fiber membranes in a parallel relationship within their respective fabric sheets and relative to hollow fiber membranes of an adjacent fiber sheet, said weft-wise fibers also serving as a spacer to maintain a separation distance between said alternately superposed fabric sheets and thereby separate adjacent ones of said feed-fiber and strip-fiber membranes.

2. An improved module as in claim 1, wherein said weft-wise fiber membranes are synthetic monofilamentary fibers.

3. An improved module as in claim 1, wherein said module case has respective supply and discharge ports for each of said feed-fiber membranes and strip-fiber membranes, and wherein terminal end portions of said fabric sheets are separated from one another and disposed within said respective supply and discharge ports associated with said feed-fiber and said strip-fiber membranes.

4. An improved contained liquid membrane module comprising:

an elongate module case having an interior space for containing a membrane liquid; and alternately superposed length-wise pleated and nested sheets of feed-fluid and strip-fluid fabrics disposed within said interior space of said module case, wherein each of said feed-fluid and strip-fluid fabrics includes hollow fiber membranes coextensive with the length-wise direction of said module case constituting feed-fibers through which a feed fluid may flow and strip-fibers through which a strip fluid may flow, respectively, and being interposed with a plurality of weft-wise fibers which separate said alternately superposed length-wise pleated and nested fabric sheets, thereby separating adjacent ones of said feed-fibers and strip-fibers in said alternately superposed fabric sheets.

5. A hollow fiber membrane module including a module case and a bundle of hollow fiber membranes within an interior space of the module case, wherein said bundle of hollow fiber membranes is comprised of at least one pair of alternately superposed length-wise pleated and nested woven fabric sheets in which said hollow fiber membranes constitute warp-wise fibers of each said fabric sheet, said fabric sheets including weft-wise fibers interposed with said hollow fiber membranes and having a denier less than the diameter of said hollow fiber membranes, said weft-wise fibers establishing a separation distance between hollow fibers of one and another of said alternately superposed length-wise pleated and nested interposed fabric sheets which corresponds essentially to the weft-wise fiber denier.

6. A hollow fiber membrane module as in claim 5, wherein said hollow fiber membranes of each said alternately superposed fabric sheet are maintained in parallel to one another and to hollow fiber membranes of an adjacent fabric sheet by means of said weft-wise fibers interposed therewith.

7. A method of making a module containing hollow fiber membranes comprising the steps of:

alternately superposing at least one pair of fabric sheets each coextensively containing a number of parallel warp-wise hollow fiber membranes, said fabric sheets including weft-wise fibers interposed with said hollow fiber membranes;

pleating the alternately superposed fabric layers in a lengthwise direction so that the pleated fabric sheets are nested with one another in the lengthwise direction; and then positioning said alternately superposed lengthwise pleated and nested fabric sheets within a module case such that the warp-wise hollow fiber membranes extend in the lengthwise direction of the case.

8. A method as in claim 7 wherein said step of superposing said fabric sheets includes the step of separating end regions of the superposed fabric sheets.

9. A method as in claim 8, wherein said end portions are positionally restrained so as to maintain said separation thereof.

10. A method as in claim 8, wherein said step of separating the end regions of superposed fabric sheets includes interposing separator strips between said end regions.

11. A method as in claim 10, wherein said step of separating the end regions of superposed fabric sheets includes bundling the separated end regions and removing said interposed separator strips.

* * * * *